United States Patent
Yamato

(10) Patent No.: US 10,445,128 B2
(45) Date of Patent: Oct. 15, 2019

(54) SERVER SELECTION DEVICE, SERVER SELECTION METHOD, AND SERVER SELECTION PROGRAM

(71) Applicant: NIPPON TELEGRAPH AND TELEPHONE CORPORATION, Chiyoda-ku (JP)

(72) Inventor: Yoji Yamato, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 0 days.

(21) Appl. No.: 15/566,323

(22) PCT Filed: Mar. 22, 2016

(86) PCT No.: PCT/JP2016/059031
§ 371 (c)(1),
(2) Date: Oct. 13, 2017

(87) PCT Pub. No.: WO2016/167086
PCT Pub. Date: Oct. 20, 2016

(65) Prior Publication Data
US 2018/0113734 A1  Apr. 26, 2018

(30) Foreign Application Priority Data

Apr. 17, 2015 (JP) ................................. 2015-085321

(51) Int. Cl.
*G06F 11/30* (2006.01)
*G06F 11/34* (2006.01)
(Continued)

(52) U.S. Cl.
CPC ...... *G06F 9/45558* (2013.01); *G06F 9/45541* (2013.01); *G06F 11/301* (2013.01);
(Continued)

(58) Field of Classification Search
CPC .................................................. G06F 9/45558
See application file for complete search history.

(56) References Cited

U.S. PATENT DOCUMENTS

2016/0004551 A1* 1/2016 Terayama ............. G06F 9/5011
718/1

FOREIGN PATENT DOCUMENTS

| JP | 2007-48315 A | 2/2007 |
| WO | WO 2015/049789 A1 | 4/2015 |

OTHER PUBLICATIONS

Kumar et al., "Dynamic Resource Allocation and Management Using OpenStack", Computer Society Chapter, IEEE Delhi Section, NTTH266429, (2014), 5 pages (Year: 2014).*

(Continued)

*Primary Examiner* — Sisley N Kim
(74) *Attorney, Agent, or Firm* — Oblon, McClelland, Maier & Neustadt, L.L.P.

(57) ABSTRACT

If it is determined that the performance requirements with respect to a server have throughput equal to or greater than a first threshold value or have latency equal to or smaller than a second threshold value, then a server selection device selects a bare metal. If the performance requirements do not have the throughput equal to or greater than the first threshold value and do not have the latency equal to or smaller than the second threshold value, when the functional requirements with respect to the server need the OS either to be an OS other than a predetermined OS, the server selection device selects a virtual machine; and, when the functional requirements with respect to the server neither need the OS to be an OS other than a predetermined OS, the server selection device selects a container.

9 Claims, 10 Drawing Sheets

(51) Int. Cl.
*G06F 9/455* (2018.01)
*H04L 29/08* (2006.01)

(52) U.S. Cl.
CPC ...... *G06F 11/3006* (2013.01); *G06F 11/3433* (2013.01); *H04L 67/10* (2013.01); *H04L 67/1004* (2013.01); *G06F 2009/4557* (2013.01); *G06F 2009/45562* (2013.01); *G06F 2009/45587* (2013.01); *G06F 2009/45591* (2013.01); *G06F 2009/45595* (2013.01)

(56) References Cited

OTHER PUBLICATIONS

International Search Report dated Jun. 21, 2016, in PCT/JP2016/059031 filed Mar. 22, 2016.
Kumar et al., "Dynamic Resource Allocation and Management Using OpenStack", Computer Society Chapter, IEEE Delhi Section, NTTH266429, (2014), 5 pages.
Felter et al., "An Updated Performance Comparison of Virtual Machines and Linux Containers", IBM Research Report, RC25482 (AUS1407-001), (2014), 15 pages.
Peng et al., "CASTE: a Cloud-Based Automatic Software Test Environment", World Academy of Science, Engineering and Technology, vol. 6, NTTH266429, (2012), pp. 1449-1452.
Yamato, "Automatic verification technology of software patches for user virtual environments on IaaS cloud", Journal of Cloud Computing: Advances, Systems and Applications, vol. 4, No. 4, (2015), 14 pages.
European Search Report dated Nov. 13, 2018 in European Application No. 16779877.6 (citing document AX, therein), 7 pages.
Ivan Krsul, et al. "VMPlants", Supercomputing, 2004, Proceedings of the ACM/IEE SC2004 Conference Pittsburgh, PA, USA Nov. 6-12, 2004, Piscataway, NJ, USA, IEEE, 1730 Massachusetts Ave., NW Washington, DC 20036-1992 USA, Nov. 6, 2004 (Nov. 6, 2004), p. 7, XP056095912, DOI: 1109/SC.2004.67, ISBN: 978-0-7695-2153-4.

\* cited by examiner

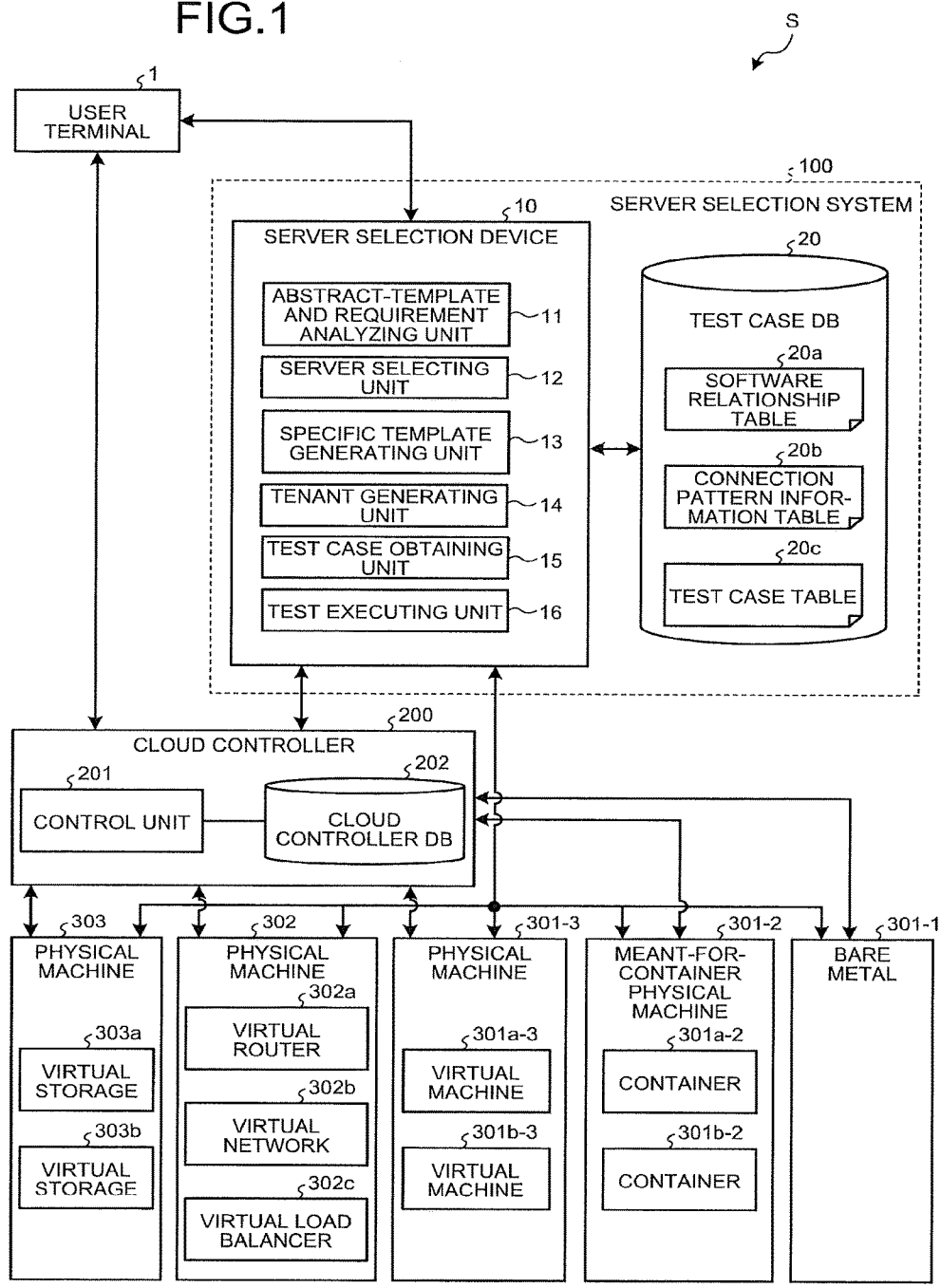

FIG.3

| FUNCTIONAL CONFIGURATION | SOFTWARE GROUP | SOFTWARE NAME |
|---|---|---|
| OS | OS#A | OS#A Server 2012 |
| OS | OS#A | OS#A 8.1 |
| OS | OS#B | OS#B 7.0 |
| OS | OS#B | OS#B 6.1 |
| DB | DB#A | DB#A 11g |
| DB | DB#A | DB#A 10g |
| DB | DB#B | DB#B 5.0 |
| DB | DB#B | DB#B 4.0 |
| Web | Web#A | Web#A 2.1 |
| Web | Web#A | Web#A 2.2 |
| Web | Web#B | Web#B 8.0 |
| Web | Web#B | Web#B 8.5 |
| AP | AP#A | AP#A 6.0 |
| AP | AP#A | AP#A 7.0 |
| ⋮ | ⋮ | ⋮ |

| CONNECTION PATTERN NAME | CONNECTION DEFINITION INFORMATION |
|---|---|
| Web 3-tier | {Web}{AP}{DB} |
| Web 3-tier | {Web,AP}{DB} |
| Web 3-tier | {Web}{AP,DB} |
| Web 3-tier | {Web,AP,DB} |
| ⋮ | ⋮ |

| CONNECTION PATTERN | FUNCTIONAL CLASSIFICATION | SOFTWARE GROUP | SOFTWARE NAME | TEST CASE | TEST CASE TYPE | CONFIRMATION TARGET |
|---|---|---|---|---|---|---|
| | DB | | | CRUD OF TABLE | DB FUNCTIONAL CLASSIFICATION | FUNCTION |
| | DB | | | JAPANESE DATA DISPLAY CHARACTER CHECK | DB FUNCTIONAL CLASSIFICATION | DATA |
| | DB | DB#A | | | DB#A SOFTWARE GROUP | |
| | DB | DB#B | | NORMALCY OF ACCESS BY MANAGEMENT TOOL | DB#B SOFTWARE GROUP | FUNCTION |
| | DB | DB#C | | | DB#C SOFTWARE GROUP | |
| Web 3-tier | | | | TRANSACTION BENCHMARK | Web 3-tier CONNECTION PATTERN | |
| ... | ... | ... | ... | ... | ... | ... |

20c

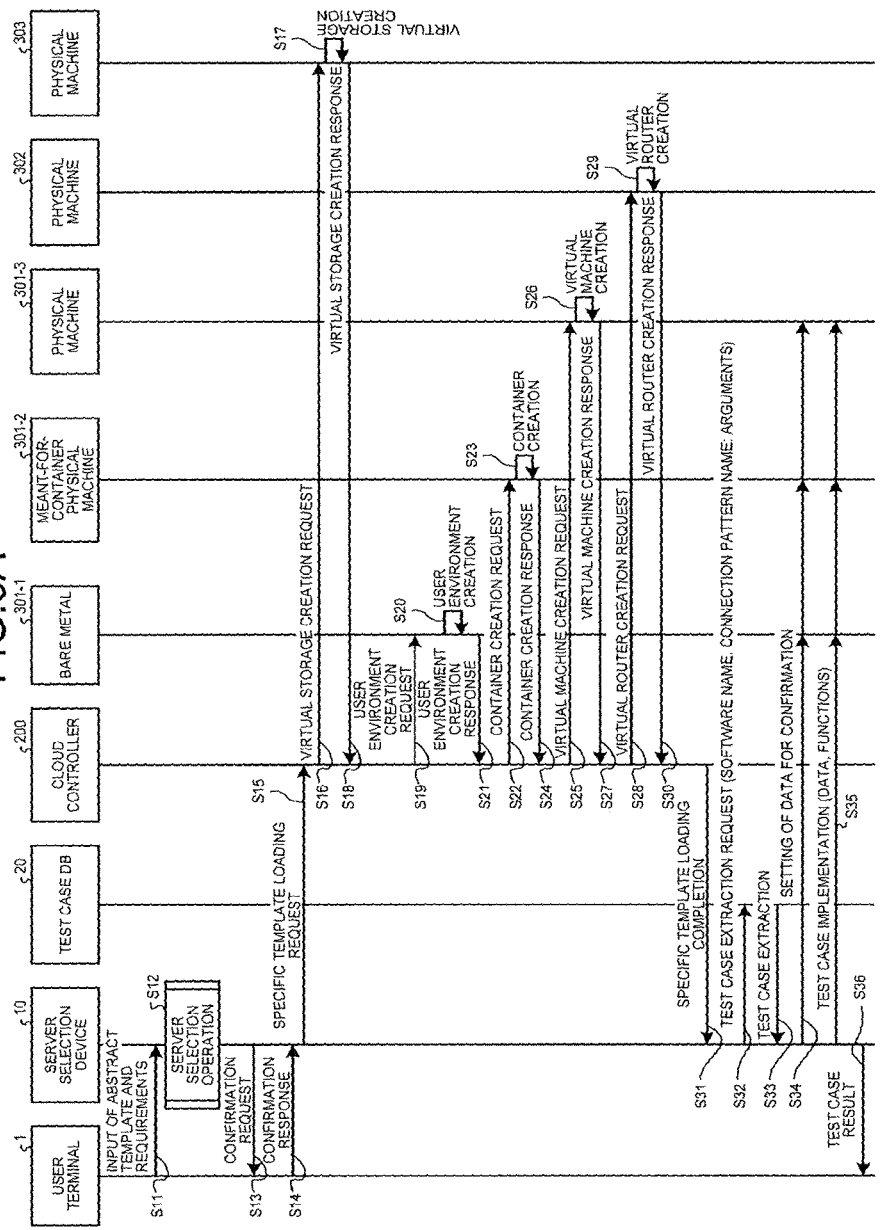

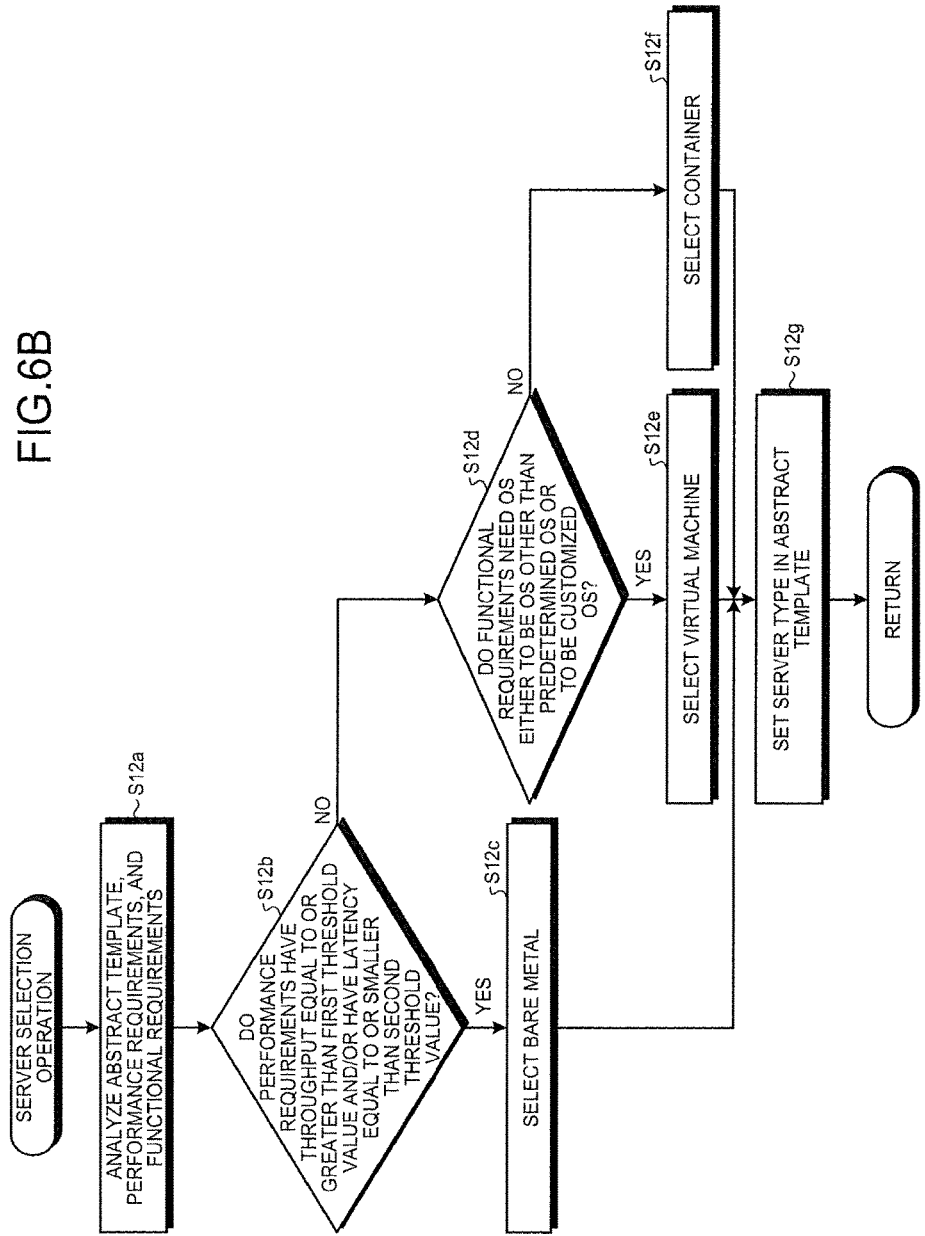

FIG.7B

```
                                    t2
"vm-1":{"Properties":{"availability_zone":"AZ1",
       "block_device_mapping":[{"delete_on_termination":"0",
           "volume_id":{"Ref":"volume-1"}                          ——p2
        }],
        "flavor":"baremetal",                                      ——p4
        "name":"testVM",
        "networks":[{"port":{"Ref":"vm-1-port-1"}}]
    },
    "Type":"OS::Nova::Server"
 },
 "vm-1-port-1":{"Properties":{"admin_state_up":"true",
     "fixed_ips":[{"ip_address":"10.10.0.111",
         "subnet_id":{"Ref":"ul2-subnet"}
       }],
     "network_id":{"Ref":"ul2"}
    },
    "Type":"OS::Neutron::Port"
 },
 "volume-1":{"Properties":{"availability_zone":"AZ1",
        "description":"testVolume",
        "image":"CentOS6",                                         ——p3
        "name":"vol-test",
        "size":"10GB"
    },
    "Type":"OS::Cinder::Volume"
 },
}
```

SERVER SELECTION DEVICE, SERVER SELECTION METHOD, AND SERVER SELECTION PROGRAM

FIELD

The present invention relates to a server selection device, a server selection method, and a server selection program.

BACKGROUND

In recent years, cloud services, such as the hosting service and IaaS (Infrastructure as a Service), have become popular for the purpose of provisioning of virtual resources to a user. By making a contract with a service provider; a user can utilize, on demand, virtual devices such as virtual servers, virtual networks, virtual routers, virtual storages, and virtual load balancers (for example, Amazon Web Services (registered trademark), <http://aws.amazon.com/ec2>). For example, the user operates middleware such as an OS (Operating System), a DB (Data Base) server, a Web server, and a mail server on a virtual server; and can build his or her dedicated server without having to arrange for hardware.

Moreover, open source software for implementing the IaaS has also become popular and, for example, a large number of commercial cloud services based on OpenStack (registered trademark, the same applies hereafter) have been developed (for example, Rackspace (registered trademark) Public Cloud Powered by OpenStack, http://www.rackspace.com/cloud/).

Typically, virtual servers are primarily virtual machines operating in a hypervisor such as Xen (registered trademark, the same applies hereafter) or KVM (Kernel based Virtual Machine). However, a large virtualization overhead of hypervisors has led to the emergence of providers that provide container-type virtual servers having a smaller virtualization overhead or bare metal servers not accompanying virtualization. Thus, because of an increase in the types of servers such as bare metal servers, container-type virtual servers, and virtual machines; it is believed that the utilization of cloud services such as the IaaS will get promoted.

CITATION LIST

Patent Literature

Non Patent Literature 1: R. Kumar and B. B. Parashar, "Dynamic Resource Allocation and Management Using OpenStack," Network and service management (cnsm), 2012 8th international conference and 2012 workshop on systems virtualization management (svm), pp. 309-315, October 2012.

Non Patent Literature 2: W. Felter, A. Ferreira, R. Rajamony and J. Rubio, "An Updated Performance Comparison of Virtual Machines and Linux Containers," IBM Research Report, July 2014.

Non Patent Literature 3: Fuyang Peng, Bo Deng and Chao Qi, "CASTE: a Cloud-Based Automatic Software Test Environment," World Academy of Science, Engineering & Technology, Issue 71, pp. 1449-1452, November 2012.

Non Patent Literature 4: Y. Yamato, "Automatic verification technology of software patches for user virtual environments on IaaS cloud," Springer Journal of Cloud Computing 2015, 4:4, DOI: 10.1186/s13677-015-0028-6, February 2015.

SUMMARY

Technical Problem

However, the conventional technology mentioned above is not meant to make proper use of bare metal servers, container-type virtual servers, and virtual machines for different purposes. For example, Non Patent Literature 1 mentioned above relates to a technology related to cloud management using OpenStack, and Ironic is disclosed as a technology for the provisioning of bare metal servers in OpenStack. However, Ironic is not meant to make proper use of bare metal servers and virtual machines for different purposes.

Moreover, for example, Non Patent Literature 2 mentioned above only compares the performance of bare metal servers, Docker-based container-type virtual servers, and KVM-based virtual machines; and is not meant to make proper use of bare metal servers, container-type virtual servers, and virtual machines for different purposes.

Furthermore, for example, although Non Patent Literature 3 mentioned above is a technology related to trial automation in the cloud, it is necessary to keep a large number of scripts ready in advance, and is thus not meant for performance testing of each user environment. Moreover, for example, although Non Patent Literature 4 is a technology related to verification automation of correction programs (patches) to be applied to the OS or the software of virtual devices in the cloud, it is meant to perform testing of individual virtual devices but not meant for testing across a plurality of virtual devices. Since the server type, the relation of connection, and the installed software selected by each user is different; it requires significant man-hours to prepare in advance a test pattern matching with that user environment. For that reason, in the present scenario, automation of performance testing has not been achieved with respect to a system built in the cloud.

That is, the conventional technology mentioned above is neither meant to select, according to the performance requirements of a user, the server type from among a bare metal server, a container-type virtual server, and a virtual machine for designing a user-by-user virtual environment including the selected virtual server, nor meant for automatic performance verification of the system across a plurality of virtual devices in the designed virtual environment. For that reason, in the conventional technology mentioned above, it is not easy to build a virtual environment that satisfies the performance requirements of the user.

An exemplary embodiment disclosed in the application concerned is described in view of the issues mentioned above, and it is an object of the embodiment to enable building with ease a virtual environment satisfying the performance requirements of the user.

Solution to Problem

According to an exemplary embodiment disclosed in the application concerned, an identification device and server selection method receives input of a first-type template, in which a configuration of a virtual environment including a server is written, a performance requirement indicating throughput or latency demanded by a user with respect to the server, and a functional requirement indicating information about OS (Operating System) that is run in the server. then, an identification device and server selection method, when the performance requirement represents a performance condition indicating throughput equal to or greater than a first threshold value or indicating latency equal to smaller than a second threshold value, selects a bare metal server as type of the server, when the performance requirement does not represent the performance condition and when the functional requirement represents a functional condition indicating OS other than a predetermined OS or indicating OS requiring customization, selects a virtual machine as type of the server, and when the performance requirement does not represent the performance condition and when the functional requirement does not represent the functional condition, selects a container-type virtual server as type of the server.

Advantageous Effects of Invention

According to an exemplary embodiment disclosed in the application concerned, for example, a virtual environment satisfying the performance requirements of the user can be built with ease.

BRIEF DESCRIPTION OF DRAWINGS

FIG. 1 is a diagram illustrating an exemplary configuration of a virtual device system including a server selection system.

FIG. 3 is a diagram illustrating an example of a software relationship table.

FIG. 4 is a diagram illustrating an example of a connection pattern information table.

FIG. 5 is a diagram illustrating an example of a test case table.

FIG. 6A is a sequence diagram for explaining an example of the server selection operation performed in the virtual device system.

FIG. 6B is a flowchart for explaining an example of the server selection operation performed in a server selection device.

FIG. 7B is a diagram illustrating an example of a specific template.

DESCRIPTION OF EMBODIMENTS

[Embodiment]

Figure 2A:
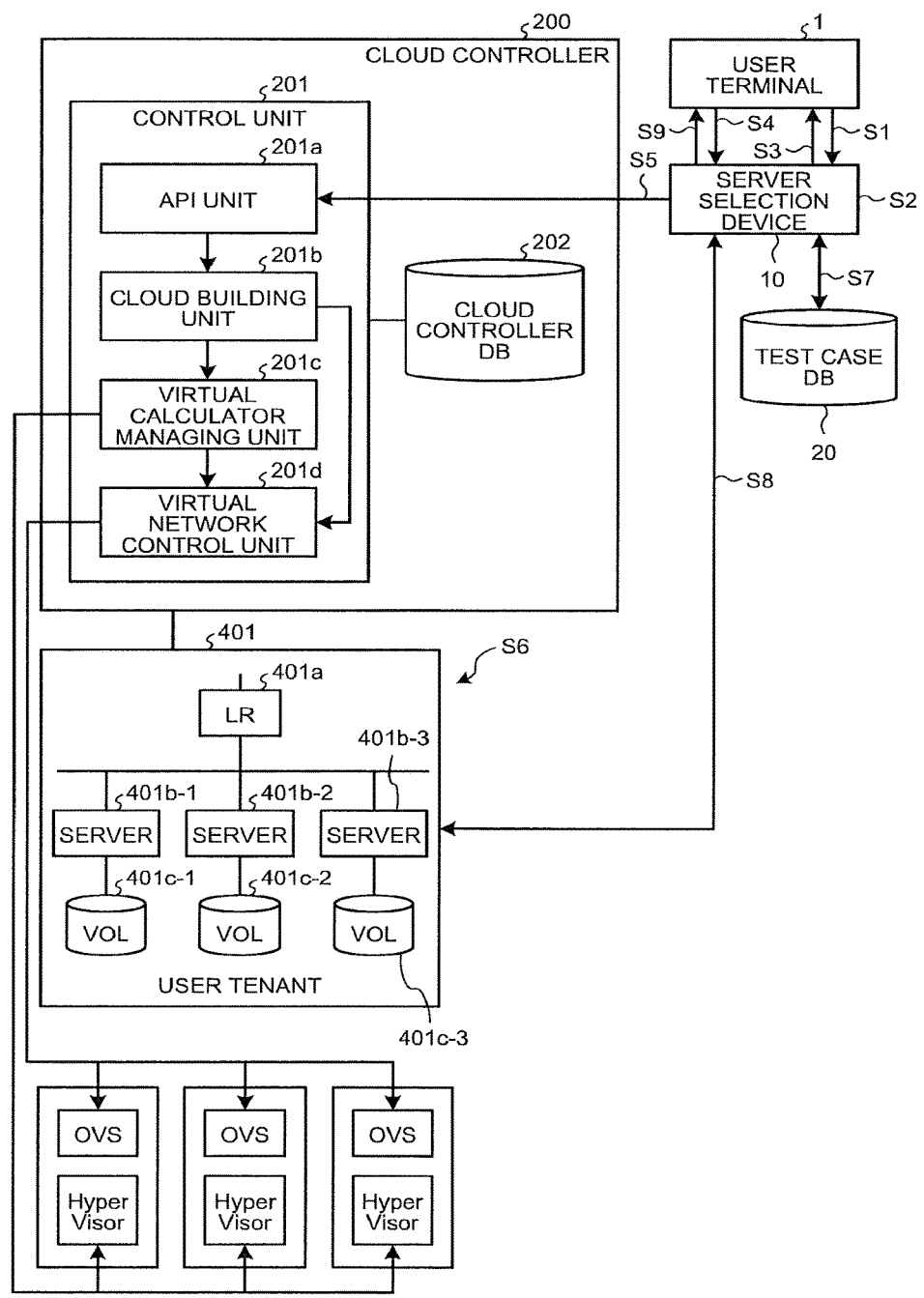
FIG. 2A is a diagram illustrating an example of a server selection operation performed in the virtual device system.

An embodiment of a server selection device, a server selection method, and a server selection program disclosed in the application concerned is described below. Meanwhile, the embodiment described below is only exemplary, and the technology disclosed in the application concerned is not limited to that embodiment. Moreover, the embodiment and the modification examples thereof as described below can be appropriately combined without causing any contradiction.

In the embodiment described below, a "user" implies a party to a contract of a user tenant that represents a user-by-user virtual environment including virtual devices such as bare metals, containers, and virtual machines.

Prior to the explanation of the embodiment, the explanation is given about "bare metals", "containers", and "virtual machines". A "bare metal" is a bare metal server and implies a physical machine that is not virtualized. A "container" is a container-type virtual server and implies one or more virtual servers that are formed by virtualizing the OS running in a single physical machine and that run in a single physical machine by segregating the resources of the physical machine for each user space, which represents the unit of the container, while sharing the kernel space of the OS. A "virtual machine" implies a virtual server that results from the virtualization of hardware of a single physical machine and that runs in one or more hardware units emulated by the hypervisor running in the physical machine.

The bare metal is identical to, for example, the conventional Dedicated Hosting. For example, SoftLayer (registered trademark) of IBM (registered trademark) has been prepared for providing services as a bare metal cloud by adding thereto cloud characteristics such as provisioning and pay-as-you-go. Moreover, for example, OpenStack has a component called Ironic meant for the provisioning of a bare metal. By virtue of being a dedicated physical machine, a bare metal has a higher degree of freedom in server building as compared to a container. Moreover, by virtue of being a dedicated physical machine, a bare metal has a higher performance as compared to a container and a virtual machine. On the other hand, as compared to a container and a virtual machine, a bare metal takes a longer time for activation upon being subjected to provisioning, and is not capable of live migration.

A container is conventionally provided by implementing, for example, an OS virtualization technology such as OpenVZ that is used in a VPA (Virtual Private Server). In a container, virtualization is performed by isolating the computer resources in units called containers. However, a container differs from a hypervisor running a virtual machine in the way of sharing the kernel of the OS. Since the emergence in year 2013 of Docker in which LXC (Linux (registered trademark, the same applies hereafter) container) is used, the use of containers is on the rise due to their user-friendliness. Although not having the degree of freedom regarding the kernel, since a container gets created just by booting a process, it has the shortest activation period as compared to a bare metal and a virtual machine. Moreover, a container has a smaller performance loss as compared to a virtual machine. Meanwhile, for example, OpenVZ that provides containers is capable of live migration, but Docker or LXC is not capable of live migration in the present scenario.

A virtual machine is conventionally provided by implementing a hardware virtualization technology in which hardware is emulated using a hypervisor. Because of running in emulated hardware, a virtual machine can freely customize the OS. Examples of the hypervisor include Xen, KVM, and VMware ESX (registered trademark). A virtual machine has a higher degree of freedom as compared to a container. Moreover, a virtual machine is capable of live migration. On the other hand, because of the overhead of hardware emulation, a virtual machine has poorer performance as compared to a bare metal and a container. Moreover, a virtual machine has a longer activation period as compared to a container.

Meanwhile, in the embodiment described above, a bare metal, a container, and a virtual machine are collectively referred to as a "server".

(Configuration of Virtual Device System)

FIG. 1 is a diagram illustrating an exemplary configuration of a virtual device system including a server selection system. A virtual device system S includes a user terminal 1, a server selection system 100, a cloud controller 200, a bare metal 301-1, a meant-for-container physical machine 301-2, and physical machines 301-3, 302, and 303. Herein, at least the cloud controller 200, the bare metal 301-1, the meant-for-container physical machine 301-2, and the physical machines 301-3, 302, and 303 are installed in, for example, a data center.

The user terminal 1 is a terminal of the user who operates the server selection system 100. Besides, the user terminal 1 is a terminal also of the users who operate the virtual resources in the bare metal 301-1, the meant-for-container physical machine 301-2, and the physical machines 301-3, 302, and 303.

In FIG. 1 is illustrated an example in which containers 301a-2 and 301b-2 are running in the meant-for-container physical machine 301-2. Moreover, in FIG. 1 is illustrated an example in which virtual machines 301a-3 and 301b-3 are running in the physical machines 301-3. Furthermore, in FIG. 1 is illustrated an example in which a virtual router 302a, a virtual network 302b, and a virtual load balancer 302c are running in the physical machine 302. Moreover, in FIG. 1 is illustrated an example in which virtual storages 303a and 303b are running in the physical machine 303. Herein, the containers 301a-2 and 301b-2, the virtual machines 301a-3 and 301b-3, the virtual router 302a, the virtual network 302b, the virtual load balancer 302c, and the virtual storages 303a and 303b represent examples of virtual devices.

Meanwhile, the user terminal 1 and the server selection system 100 can also be installed in the same data center in which the cloud controller 200, the bare metal 301-1, the meant-for-container physical machine 301-2, and the physical machines 301-3, 302, and 303 are installed.

Meanwhile, regarding the user terminal 1, the server selection system 100, the cloud controller 200, the bare metal 301-1, the meant-for-container physical machine 301-2, and the physical machines 301-3, 302, and 303; the number of devices is only exemplary, and it is possible to have an appropriate number of devices according to the configuration of the virtual device system S. Moreover, with reference to FIG. 1, the virtual machines 301a-3 and 301b-3 are assumed to be running in the physical machine 301-3; virtual network devices such as the virtual router 302a, the virtual network 302b, and the virtual load balancer 302c are assumed to be running in the physical machine 302; and the virtual storages 303a and 303b are assumed to be running in the physical machine 303. However, the placement and the count of the virtual devices in the physical machines are not limited to that case.

(Configuration of Server Selection System)

The server selection system 100 includes a server selection device 10 and a test case DB 20. The server selection device 10 is connected to the user terminal 1 via a predetermined communication line such as a network. Moreover, the server selection device 10 is connected to the test case DB 20 via a predetermined communication line such as a network.

The test case DB 20 includes a software relationship table 20a, a connection pattern information table 20b, and a test case table 20c. The software relationship table 20a includes the following columns: "device classification", "software group", and "software name". The connection pattern information table 20b includes the following columns: "connection pattern name" and "connection definition information". The test case table 20c includes the following columns: "connection pattern", "function classification", "software group", "software name", "test case", "test case type", and "confirmation target". Regarding the details of the software relationship table 20a, the connection pattern information table 20b, and the test case table 20c; the explanation is given later.

(Configuration of Server Selection Device)

The server selection device 10 includes an abstract-template and requirement analyzing unit 11, a server selecting unit 12, a specific template generating unit 13, a tenant generating unit 14, a test case obtaining unit 15, and a test executing unit 16.

The abstract-template and requirement analyzing unit 11 analyzes an abstract template, performance requirements, and functional requirements received as input from the user terminal 1 via a Web browser or a predetermined UI (User Interface) application. Although described later in detail, a template represents a configuration template in which the configuration of a user tenant is written in, for example, the text format using a tagged language of XML (eXtensible Markup Language) or using JSON (JavaScript (registered trademark) Object Notation). An abstract template is a configuration template in which the server type such as a bare metal, a container, or a virtual machine is at least not set. A user tenant represents a user-by-user computing environment that is built on a user-by-user basis by including the bare metal 301-1 along with including the virtual devices running in the meant-for-container physical machine 301-2 and the physical machines 301-3, 302, and 303.

The performance requirements represent the system performance, such as the arithmetic processing of servers, input-output, and throughput (response time) and latency (processing delay time) related to network transfer, that is demanded by the user from the user tenant.

The functional requirements represent information indicating whether a predetermined OS (such as Linux) is installed and whether or not the OS is a customized OS in which the kernel has been customized; as well as represents information enabling determination of whether or not containers can be used.

The abstract-template and requirement analyzing unit 11 analyzes a volume image that is used in a volume attached to the abstract template which has been input from the user terminal 1. For example, the abstract-template and requirement analyzing unit 11 identifies, from the volume image written in the abstract template that is input, the pieces of software included in the volume image. Herein, the pieces of software include the OS, middleware, and applications.

A volume image is an image file of the execution environment of the server and includes the OS and the binary data of the software running in the OS. For example, when a volume image is loaded in the volumes mounted in the virtual storages 303a and 303b, the operation environments of the servers attached to those volumes are provided. Meanwhile, a volume image may be provided by a service provider, or may be unique to the user.

When a volume image is provided by a service provider, the information about the software included in that volume image is stored in a memory unit (not illustrated); and the abstract-template and requirement analyzing unit 11 can refer to that information and identify the software included in the volume image. Alternatively, when a volume image is not provided by a service provider but is, for example, unique to a user, the abstract-template and requirement analyzing unit 11 loads the volume image in a predetermined volume and examines the loaded volume for identifying the software included in the volume image.

Moreover, the abstract-template and requirement analyzing unit 11 analyzes the configuration of connection among the servers by referring to the abstract template input by the user.

Based on the software, the performance requirements, and the functional requirements identified by the abstract-template and requirement analyzing unit 11; the server selecting unit 12 selects the server type of the server, which is to be used in building the operation environment by loading the concerned image file, from among a bare metal, a container, and a virtual machine.

The specific template generating unit 13 sets the server type, which is selected by the server selecting unit 12, in the item representing the server type in the abstract template; and generates a specific template. Then, the specific template generating unit 13 presents the generated specific template to the user via the Web browser or a predetermined UI application of the user terminal 1. Subsequently, the user confirms the specific template presented via the user terminal 1, and inputs a notification about approving or discarding the specific template from the user terminal 1 to the server selection device 10. If the specific template is discarded, then the server selection device 10 again receives input of an abstract template, the performance requirements, and the functional requirements from the user terminal 1, and analyzes the received information.

The tenant generating unit 14 instructs, based on the specific template approved by the user, the cloud controller 200 to generate a user tenant that is built with one or more servers and that has the configuration defined by the approved specific template. Moreover, the tenant generating unit 14 instructs the cloud controller 200 to load the volume image, which is written in the concerned specific template, in the volume written in the concerned specific template.

Meanwhile, as far as loading of a template is concerned, the following existing technology can be implemented: "OpenStack Heat, https://wiki.openstack.org/wiki/Heat"; "Amazon CloudFormation (registered trademark, the same applies hereafter) http://aws.amazon.com/cloudformation/"; and "Y. Yamato, M. Muroi, K. Tanaka and M. Uchimura, 'Development of Template Management Technology for Easy Deployment of Virtual Resources on OpenStack', Springer Journal of Cloud Computing, DOI: 10.1186/s13677-014-0007-3, July 2014".

The test case obtaining unit 15 obtains test cases from the test case DB 20 based on the analysis result that is obtained by the abstract-template and requirement analyzing unit 11 by analyzing the configuration of connection among the servers included in the user tenant and by analyzing the installed software in each server. More particularly, the test case obtaining unit 15 classifies the pieces of software, which are included in the analysis result of the installed software in each server, in three layers of "software name", "software group", and "functional classification".

The lowermost layer of "software name" includes the specific product names and the version information of the pieces of software. The intermediate layer of "software group" represents the section for classifying each piece of software that is identified in the "software name" according to the header and/or the product family. The upper layer of "functional configuration" represents the section for classifying the pieces of software, which are classified in the "software group", according to functions such as the OS, the database, and the Web.

Moreover, based on the configuration of connection among the servers included in the user tenant as analyzed by the abstract-template and requirement analyzing unit 11, the test case obtaining unit 15 determines the "connection pattern" of each server in which the software included in the environment information of the user tenant is installed.

Then, the test case obtaining unit 15 refers to the test case table 20c and extracts, from the test case table 20c, the records of the test cases which have the item values matching with each layer of the "connection pattern", "software name", "software group", and "functional classification". For example, if the "Web 3-tier" (Web three-layer model) represents the determined "connection pattern", the test case obtaining unit 15 extracts, as the test cases, the records having "Web 3-tier" as the "connection pattern" in the test case table 20c.

Meanwhile, for example, assume that, as a result of classifying the information about the software installed in the user tenant, the test case obtaining unit 15 obtains "OS#A Server 2012" as the "software name". In that case, from the test case table 20c, the test case obtaining unit 15 extracts, as the test cases, the records having "OS#A Server 2012" as the "software name".

Alternatively, for example, assume that the test case obtaining unit 15 obtains "OS#A" as the "software group" as the information about the software included in the user tenant. In that case, the test case obtaining unit 15 extracts, as the test cases, the records having "OS#A" as the "software group" in the test case table 20c.

Still alternatively, for example, assume that the test case obtaining unit 15 obtains "OS" as the "functional classification" as the information about the software included in the user tenant. In that case, the test case obtaining unit 15 extracts, as the test cases, the records having "OS" as the "functional classification" in the test case table 20c.

Meanwhile, the test case obtaining unit 15 can extract, from the test case table 20c, the records of the test cases which have the item values matching with only either the "connection pattern", or the "software group", or the "functional classification".

Then, the test executing unit 16 implements a conventional technology such as Jenkins with respect to the user tenant created by the tenant generating unit 14, and executes the test cases extracted from the test case table 20c by the test case obtaining unit 15. When "data" represents the "confirmation target" of the test cases to be executed, the test executing unit 16 sets the test data with respect to the user tenant representing the test execution target and then executes tests with respect to that user tenant. Examples of the "confirmation target" of the test cases, which are executed by the test executing unit 16, include "function" and "data".

For example, if displaying a Japanese Web page represents a test case, a file for character display, such as a Japanese sample html file, is set before applying a patch and it is confirmed whether or not the html file is normally displayed after the patch has been applied. In order to confirm the normal display, an existing method such as comparing the display capture before and after the application of the patch or comparing the character code before and after the application of the patch can be implemented.

Then, the test executing unit 16 analyzes the result of each test case that was executed with respect to the user tenant generated by the tenant generating unit 14, and sends detailed information of the test result to the user terminal 1. For example, the test executing unit 16 sends, as detailed information of the test result to the user terminal 1, the result obtained when an application running in a server measures the performance of the items of performance requirements of the user and determines whether or not the result of measurement satisfies the performance requirements of the user.

Based on the detailed information of the test result received from the test executing unit 16, the user who is operating the user terminal 1 determines whether or not the user tenant generated based on the concerned specific template satisfies the performance requirements of the user. If the user tenant generated based on the concerned specific template is determined to satisfy the performance requirements of the user, then the user issues an instruction from the user terminal 1 to the server selection device 10 to switch the concerned user tenant for actual implementation. Upon receiving an instruction from the user terminal 1 to switch the concerned user tenant for actual implementation, the server selection device 10 instructs the cloud controller 200 to switch the concerned user tenant for actual implementation.

On the other hand, if the user tenant generated based on the concerned specific template is determined not to satisfy the performance requirements of the user, then the user newly inputs an abstract template, performance requirements, and functional requirements to the server selection device 10 from the user terminal 1. The abstract-template and requirement analyzing unit 11 analyzes the abstract template, the performance requirements, and the functional requirements that are newly input from the user terminal 1. Subsequently, the abstract-template and requirement analyzing unit 11, the server selecting unit 12, the specific template generating unit 13, the tenant generating unit 14, the test case obtaining unit 15, and the test executing unit 16 repeat identical operations to the operations described above.

(Configuration of Cloud Controller)

The cloud controller 200 includes a control unit 201 and a cloud controller DB 202. The control unit 201 controls the entire cloud controller 200, and implements various services provided by the cloud controller 200. The cloud controller DB 202 is used to store information about the state and the settings related to various services provided by the cloud controller 200.

The cloud controller 200 can use OpenStack, for example. In response to an instruction from the tenant generating unit 14 of the server selection device 10, the cloud controller 200 issues a creation request or a deletion request for creating or deleting virtual devices constituting a user tenant to the bare metal 301-1, the meant-for-container physical machine 301-2, and the physical machines 301-3, 302, and 303. Meanwhile, although the user environment created in the bare metal 301-1 makes the bare metal 301-1 function as a single physical server, herein the bare metal 301-1 is assumed to be a single virtual device for the purpose of illustration.

In response to a creation request or a deletion request for creating or deleting virtual devices; the bare metal 301-1, the meant-for-container physical machine 301-2, and the physical machines 301-3, 302, and 303 create a virtual device in the bare metal 301-1, the meant-for-container physical machine 301-2, and the physical machines 301-3, 302, and 303, respectively, or delete the virtual device from the bare metal 301-1, the meant-for-container physical machine 301-2, and the physical machines 301-3, 302, and 303, respectively. The core services of OpenStack include Compute, Identity, Networking, and Block Storage. The cloud controller DB 202 is used to store the information related to the state and the settings of the core services.

(Server Selection Operation in Virtual Device System)

FIG. 2A is a diagram illustrating an example of a server selection operation performed in the virtual device system.

In FIG. 2A is illustrated a case in which OpenStack is used as the cloud controller 200. Moreover, in FIG. 2A is illustrated a case in which the control unit 201 of the cloud controller 200 includes an API (Application Programming Interface) unit 201a, a cloud building unit 201b, a virtual calculator managing unit 201c, and a virtual network control unit 201d.

The API unit 201a is an API responsible for the coordination between the cloud controller 200 and the outside, and is equivalent to "OpenStack API" in OpenStack. The cloud building unit 201b represents a cloud orchestration function that defines the resource deployment in the cloud and the system configuration, and automates the formulation and the operations of the system; and is equivalent to "Heat" in OpenStack.

The virtual calculator managing unit 201c represents the function of managing, as the resource pool, the virtual calculators applied by the virtual machines running in HyperVisor and providing the virtual calculators; and is Equivalent to "Nova" in OpenStack.

The virtual network control unit 201d is a component that treats network functions such as virtual switches, such as OVS (Open vSwitch), virtual routers, virtual networks, virtual subnets, and virtual ports as the control targets; and is equivalent to "Neutron" in OpenStack.

Meanwhile, in the example illustrated in FIG. 2A, it is assumed that, when an instruction to generate a user tenant has been issued by the server selection device 10, a user tenant 401 is generated. The user tenant 401 includes an LR (Logical Router: a logical router or a virtual router), servers 401b-1 to 401b-3, and VOLs (Volumes: virtual volumes or virtual storages) 401c-1 to 401c-3.

Figure 2B:
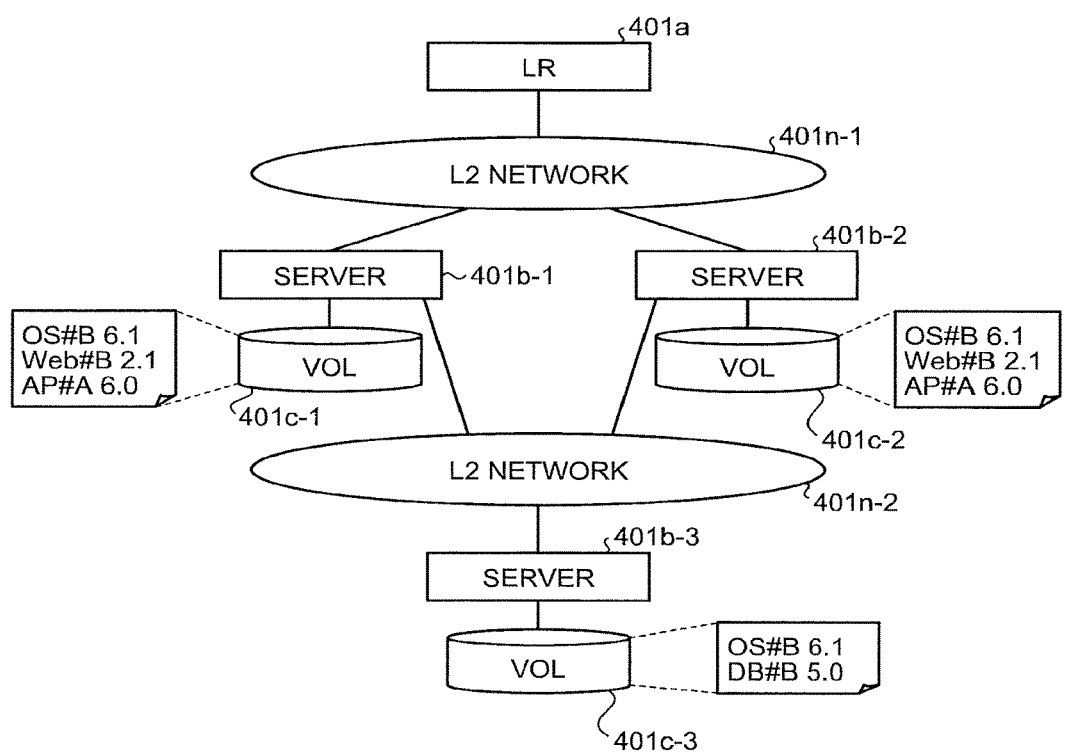
FIG. 2B is a diagram illustrating an exemplary configuration in which the functions range across a plurality of virtual servers in a user tenant.

For example, a specific template used in OpenStack Heat indicates the attributes and the relation of connection of each virtual device written using JSON or HOT. The user tenant 401 generated based on the specific template has the configuration of connection as illustrated in FIG. 2B as an example. Moreover, the fact that the user tenant 401 has the relation of connection as illustrated in FIG. 2B is understood by parsing the specific template.

FIG. 2B is a diagram illustrating an exemplary configuration in which the functions range across a plurality of virtual servers in a user tenant. As illustrated in FIG. 2B, in the user tenant 401, servers 401b-1 and 401b-2 are connected under an LR 401a via an L2 network 401n-1. In a VOL 401c-1 present under the server 401b-1, a volume image including "OS#B6.1", "Web#B2.1", and "AP#A6.0" is loaded. In a VOL 401c-2 present under the server 401b-2, a volume image including "OS#B6.1", "Web#B2.1", and "AP#A6.0" is loaded. Moreover, the servers 401b-1 and 401b-2 are connected to the server 401b-3 via an L2 network 401n-2. In a VOL 401c-3 present under the server 401b-3, a volume image including "OS#B6.1" and "DB#B5.0" is loaded.

In FIG. 2B, each of the servers 401b-1, 401b-2, and 401b-3 is a server of the server type selected from among a bare metal, a container, and a virtual machine according to the performance requirements and the function requirements of the software including the OS, middleware, and applications loaded in the VOLs 401c-1, 401c-2, and 401c-3.

The server selection device 10 analyzes, for example, the configuration of connection among the servers of the user tenant 401 by referring to the abstract template input by the user. The server selection device 10 parses the abstract template and, for example, obtains connection information in the form of {Web, AP} {DB}. As described later, based on the obtained connection information {Web, AP} {DB}, the server selection device 10 searches the connection pattern information table 20b and recognizes that "{Web, AP} {DB}" representing the "connection definition information" has "Web3-tier" as the "connection pattern name".

Meanwhile, as contract information, the service provider manages an ID (Identifier), a password, and an access method for the purpose of accessing the user tenant.

Explained below with reference to FIG. 2A is a server selection operation performed in the virtual device system S. Firstly, at Step S1, the user requests the server selection device 10 for a proposal of a specific template satisfying an abstract template, performance requirements, and functional requirements. As described earlier, a template is a text file in the JSON format or the HOT format in which configuration information for batch provisioning of virtual devices is written and which is used in OpenStack Heat or Amazon CloudFormation.

Meanwhile, in a template input to OpenStack Heat, flavor (specifications information) of the server needs to be specified. However, at the stage of the abstract template, the flavor may remain unspecified. Moreover, in a template, image files of the OS and the applications to be used are also specified. The images can be provided by the service provider or can be images unique to the user. Along with inputting an abstract template, the user specifies the functional requirements and the performance requirements of each server. The performance requirements include, for example, the requirements related to the throughput and/or the latency of the server such as the arithmetic processing time of the server, the network transfer time, and the file input-output time. The functional requirements include, for example, information indicating whether the OS is, for example, an OS other than Linux, or an OS requiring customization of the kernel; and is used in determining whether a container can be used.

Subsequently, at Step S2, the server selection device 10 refers to the abstract template input by the user and analyzes the configuration of connection among the servers and the installed software in each server. The abstract template includes the description of the images. If the images are unique to the user, then the server selection device 10 temporarily loads the images in volumes and obtains information for the purpose of analyzing which pieces of software are installed. In that case, the server selection device 10 receives input of login information from the user at Step S1. As a result of the analysis, the server selection device 10 gets to know about the system configuration as illustrated in FIG. 2B, for example.

Then, at Step S3, the server selection device 10 selects the server type based on the performance requirements specified by the user at Step S1; generates a specific template in which the server type is specifically written; and outputs the specific template to the user. In the specific template output to the user, a specific server type is specified for each flavor of the abstract template, thereby enabling the user to distinguish between a bare metal, a container, and a virtual machine.

Subsequently, at Step S4, the user confirms the specific template output by the server selection device 10 at Step S3 and, if there is no problem, sends an approval to the server selection device 10 using the user terminal 1. Upon receiving the approval from the user, the server selection device 10, finalizes the specific template in which the flavor is specified.

Then, at Step S5, the server selection device 10 requests the cloud controller 200 to specify the load destination tenant and to load the specific template. Subsequently, at Step S6, the cloud controller 200 generates (performs batch provisioning of) the user tenant 401 as the specified tenant that includes the group of virtual devices written in the specific template.

Subsequently, at Step S7, in order to verify that the performance of the virtual devices included in the user tenant subjected to batch provisioning is sufficient, based on the analysis result obtained at Step S2 by analyzing the configuration of connection among the servers and analyzing the installed software in each server, the server selection device 10 auto-extracts, from the test case DB 20, performance verification test cases in accordance with the generated user tenant 401. The performance verification test cases that are extracted not only include test cases about the performance of individual servers but also include test cases about the coordinated performance of a plurality of servers (for example, transaction processing in the Web three-layer system).

Then, at Step S8, the server selection device 10 executes the test cases, which are obtained from the test case DB 20, with respect to the user tenant 401 using an existing automation tool such as Jenkins. Although the performance verification of the user tenant as performed by executing test cases is intended for the performance verification of the servers included in the user tenant 401, the test cases are executed with respect to all virtual devices included in the user tenant 401. For example, if a plurality of servers is installed under a virtual load balancer and if a Web server is included in the servers, then the performance verification of the Web server is performed via the virtual load balancer.

Subsequently, at Step S8, the server selection device 10 collects the result of the executed test cases, and aggregates the tests performed for each user and the result of those tests using an existing automation tool such as Jenkins.

Then, at Step S9, the server selection device 10 notifies the user about the aggregated information via the user terminal 1 using an email or the Web. Upon receiving the notification of the information, the user confirms that the performance requirements and the functional requirements are satisfied by all virtual devices included in the user tenant 401 that has been subjected to batch provisioning, and then starts the actual implementation of the user tenant 401. Meanwhile, if the performance requirements and the functional requirements are not satisfied by the virtual devices included in the user tenant 401 that has been subjected to batch provisioning, then the user deletes the user tenant 401 using the API unit 201a of the cloud controller 200 via the server selection device 10. Subsequently, returning to Step S1, the user newly requests the server selection device 10 about a proposal of a specific template satisfying an abstract template, performance requirements, and functional requirements. Then, the operations from Steps S1 to S9 are performed in an identical manner.

(Software Relationship Table)

FIG. 3 is a diagram illustrating an example of the software relationship table. The software relationship table 20a is used to hold the following information: information related to software; "software group" representing the concept of bundling the software together; and "functional classification" representing the concept of bundling the software groups together. Thus, the software relationship table 20a includes the following columns: "functional classification", "software group", and "software name".

As illustrated in FIG. 3, for example, when "OS" represents the "functional classification", "OS#A" and "OS#B" are included in the "software group". Moreover, as the specific software belonging to the "software group", the "OS#A" group includes "OS#A Server 2012" and "OS#A 8.1". Furthermore, for example, when "DB" represents the "functional classification", "DB#A" and "DB#B" are included in the "software group". Moreover, as the specific software belonging to the "software group", the "DB#A" group includes "DB#A 11f" and "DB#A 10g". Moreover, for example, when "Web" represents the "functional configuration", "Web#A" and "Web#B" are included in the "software group". Furthermore, as the specific software belonging to the "software group", the "Web#A" group includes "Web#A 2.1" and "Web#A 2.2". Moreover, for example, when "AP" represents the "functional classification", "AP#A" is included in the "software group". Furthermore, as the specific software belonging to the "software group", the "AP#A" group includes "AP#A 6.0" and "AP#A 7.0".

(Connection Pattern Information Table)

FIG. 4 is a diagram illustrating an example of the connection pattern information table. The connection pattern information table 20b includes the following columns: "connection pattern name" and "connection definition information". In the example of the connection pattern information table 20b illustrated in FIG. 4, the Web 3-tier represents the connection pattern. For example, {Web, AP} {DB} representing the "connection definition information" in FIG. 4 indicates that a Web server and an application (AP) server are installed in the same server, while a DB server is installed in a different server. That is, it is indicated that the pieces of software which are clubbed in a single pair of brackets, such as {x, y}, are installed in the same server, and that the pieces of software clubbed in another bracket written alongside are installed in another same server.

Moreover, a single set of "connection definition information" indicates a configuration in which a plurality of mutually-coordinating pieces of software is installed in a dispersed manner in a plurality of servers. For example, the server selection device 10 can refer to the connection information of the user tenant, the installed software information of each virtual server, and the software relationship table 20a; and can determine that the servers included in the user tenant have the installation configuration of {Web, AP} {DB}. Furthermore, the server selection device 10 can refer to the connection pattern information table 20b and can determine that "Web 3-tier" (Web three-layer model) represents the "connection pattern name" corresponding to the "connection definition information" matching with {Web, AP} {DB}. Regarding other installation configurations too, the "connection pattern name" can be identified in an identical manner.

(Test Case Table)

FIG. 5 is a diagram illustrating an example of a test case table. The test case table 20c is used to hold test cases that are executable in Jenkins, and to hold attribute information of those test cases. A test case held in the test case table 20c holds information about its type such as whether the test case is meant for each individual piece of software, or whether the test case is meant for each software group representing a group of individual pieces of software, or whether the test case is meant for each functional classification formed by bundling software groups, or whether the test case is meant for a combination test of the functions implemented in a dispersed manner in a plurality of virtual machines. The test case table 20c includes the following columns: "connection pattern", "functional classification", "software group", "software name", "test case", "test case type", and "confirmation target".

For example, a "test case" of "CRUD (Create, Read, Update, Delete) of table" is a test case that can be used in common in the "functional classification" of "DB" because it is sufficient to perform CRUD of sample data in the SQL (Structured Query Language). Moreover, CRUD of table is a "function" of the "confirmation target". Meanwhile, the throughput and the latency during CRUD are measured.

Moreover, for example, a "test case" of "Japanese data display character check" is a test case whose data can be confirmed in the SQL and thus can be used in common with the "functional classification" of "DB". Besides, since whether or not the display characters are normally displayed after the application of a patch represents data normalcy confirmation, the "confirmation target" is "data". Meanwhile, the throughput and the latency during the data display are measured.

Furthermore, for example, a "test case" of "normalcy of access by management tool" is a test case that can be used in common in the "software group" of "DB#B" in the case when the access tool is in the Web GUI of "DB#B" as the "software group"; and the "confirmation target" is "data". Meanwhile, the throughput and the latency during the access by the management tool are measured.

Moreover, for example, a "test case" of "transaction benchmark" is a test case that can be used in common in the virtual machines having the connection pattern "Web 3-tier" as the "connection pattern". That is, in the case of a Web three-layer model, the "transaction benchmark" such as TPC-W (Transaction Processing performance Council benchmark for Web) can be used as a test case.

Regarding the "connection pattern", the "software group", and the "software name" of other test cases too, the explanation is identical.

(Sequence Diagram of Server Selection Operation)

FIG. 6A is a sequence diagram for explaining an example of the server selection operation performed in the virtual device system. Firstly, the user terminal 1 inputs an abstract template, performance requirements, and functional requirements to the server selection device 10, and issues a request for proposal of a specific template satisfying the abstract template, the performance requirements, and the functional requirements (Step S11). Then, the server selection device 10 performs a server selection operation that includes identifying, from the abstract template input at Step S11, the configuration of connection among the servers and the installed software in each server as written in the abstract template; and selecting the server according to the installed software that has been identified (Step S12). Regarding the details of the server selection operation, the explanation is given later.

Subsequently, the server selection device 10 sends the specific template, in which the server type selected at Step S12 is written, to the user terminal 1, and requests the user to confirm and approve the specific template (Step S13). If the specific template sent by the server selection device 10 is approved by the user, then the user terminal 1 sends an approval response to the server selection device 10 (Step S14).

Then, the server selection device 10 requests the cloud controller 200 to load the specific template that has been approved by the user at Step S14 (Step S15). Subsequently, the cloud controller 200 requests the bare metal 301-1, the meant-for-container physical machine 301-2, and the physical machines 301-3, 302, and 303 to create virtual devices according to the description in the specific template that is to be loaded in response to a request issued by the server selection device 10 at Step S15.

Firstly, according to the description in the specific template about using a virtual storage as a virtual device, the cloud controller 200 requests the physical machine 303 to create a virtual storage based on the specific template (Step S16). Then, the physical machine 303 generates therein a virtual storage in response to the creation request issued at Step S16 (Step S17). Subsequently, the physical machine 303 sends a virtual storage creation response to the cloud controller 200 (Step S18). Herein, the cloud controller 200 and the physical machine 303 repeatedly perform the operations from Steps S16 to S18 for a number of times equal to the number of virtual storages defined in the specific template.

Then, for example, if the specific template includes description about using a bare metal as a virtual device, then the cloud controller 200 requests the bare metal 301-1 to create a user environment based on the specific template (Step S19). Subsequently, in response to the creation request issued at Step S19, the bare metal 301-1 creates therein a user environment using the virtual storage created at Step S17 (Step S20). Then, the bare metal 301-1 sends a user environment creation response to the cloud controller 200 (Step S21). Herein, the cloud controller 200 and the bare metal 301-1 repeatedly perform the operations from Steps S19 to S21 for a number of times equal to the number of bare metals defined in the specific template. Meanwhile, a bare metal is a physical server dedicated to a single user for the purpose of building a single user environment in the single physical server. Hence, in the case of creating a user environment in a plurality of bare metals, a request for creating a user environment is issued to each different bare metal. If the number of bare metals defined in the specific template is zero, then the cloud controller 200 and the bare metal 301-1 do not perform the operations from Steps S19 to S21.

Meanwhile, for example, if the specific template includes description about using a container as a virtual device, then the cloud controller 200 requests the meant-for-container physical machine 301-2 to create a container representing a user environment based on the specific template (Step S22). In response to the creation request issued at Step S22, the meant-for-container physical machine 301-2 creates a container using the virtual storage created at Step S17 (Step S23). Then, the meant-for-container physical machine 301-2 sends a container creation response to the cloud controller 200 (Step S24). Herein, the cloud controller 200 and the meant-for-container physical machine 301-2 repeatedly perform the operations from Steps S22 to S24 for a number of times equal to the number of containers defined in the specific template. In the case of creating a container in each of a plurality of meant-for-container physical machines, a request for creating a container is sent to each different meant-for-container physical machine. If the number of containers defined in the specific template is zero, then the cloud controller 200 and the meant-for-container physical machine 301-2 do not perform the operations from Steps S22 to S24.

Meanwhile, for example, if the specific template includes description about using a virtual machine as a virtual device, then the cloud controller 200 requests the physical machine 301-3 to create a virtual machine representing a user environment based on the specific template (Step S25). In response to the creation request issued at Step S25, the physical machine 301-3 creates therein a virtual machine using the virtual storage created at Step S17 (Step S26). Then, the physical machine 301-3 sends a virtual machine creation response to the cloud controller 200 (Step S27). The cloud controller 200 and the physical machine 301-3 repeatedly perform the operations from Steps S25 to S27 for a number of times equal to the number of virtual machines defined in the specific template. In the case of creating a virtual machine in each of a plurality of physical machines, a request for creating a virtual machine is issued to each different physical machine. If the number of virtual machines defined in the specific template is zero, then the cloud controller 200 and the physical machine 301-3 do not perform the operations from Steps S25 to S27.

Meanwhile, for example, if the specific template includes description about using a virtual router as a virtual device, then the cloud controller 200 requests the physical machine 302 to create a virtual router based on the specific template (Step S28). In response to the creation request issued at Step S28, the physical machine 302 creates therein a virtual router (Step S29). Then, the physical machine 302 sends a virtual router creation response to the cloud controller 200 (Step S30). The cloud controller 200 and the physical machine 302 repeatedly perform the operations from Steps S28 to S30 for a number of times equal to the number of virtual routers defined in the specific template. In the case of creating a virtual machine in each of a plurality of physical machines, a request for creating a virtual router is issued to each different physical machine. If the number of virtual routers defined in the specific template is zero, then the cloud controller 200 and the physical machine 302 do not perform the operations from Steps S28 to S30.

Subsequently, the cloud controller 200 sends a notification of specific template loading completion to the server selection device 10 (Step S31).

Then, the server selection device 10 searches the test case DB 20 for the "software group", the "functional classification", and the "connection pattern", with the "software name" and/or the "connection pattern", which are identified based on the configuration of connection among the servers and the installed software in each server as known at Step S12, serving as arguments; and extracts from the test case DB 20 the "test case" corresponding to the "functional classification", and/or the "software group", and/or the "connection pattern" (Steps S32 and S33). The "test case" extracted at Step S33 are executed by the server selection device 10 using a test automation tool such as Jenkins. Meanwhile, prior to the execution of the "test case", if required for the purpose of performance requirement verification, the server selection device 10 sets data for confirmation in the bare metal 301-1, the meant-for-container physical machine 301-2, and the physical machine 301-3 (Step S34).

Subsequently, the server selection device 10 implements the test cases, which were extracted at Step S33, with respect to the target bare metal 301-1, the container created in the meant-for-container physical machine 301-2, and the virtual machine created in the physical machine 301-3 (Step S35). Then, the server selection device 10 collects the test result and sends the user-by-user test case results to the user terminal 1 (Step S36). Based on the test case implementation result, the user can determine whether or not the specific template proposed at Step S13 is appropriate.

(Server Selection Operation in Server Selection Device)

FIG. 6B is a flowchart for explaining an example of the server selection operation performed in the server selection device. Herein, FIG. 6B is a diagram for explaining the detailed operations performed at Step S12 illustrated in FIG. 6A. Generally, regarding the price of a server, container<virtual machine<bare metal holds true. In that regard, the server selection operation illustrated in FIG. 6B is intended to propose a virtual machine or a bare metal for such server functions which cannot be implemented using a low-cost container.

As illustrated in FIG. 6B, firstly, the server selection device 10 analyzes the abstract template, the performance requirements, and the functional requirements that are input from the user terminal 1 via the Web browser or via a predetermined UI application (Step S12a). Then, based on the analysis result obtained at Step S12a, the server selection device 10 determines whether or not the performance requirements with respect to the server have the throughput equal to or greater than a first threshold value and/or have the latency equal to or smaller than a second threshold value (Step S12b).

If it is determined that the performance requirements with respect to the server have the throughput equal to or greater than the first threshold value and/or have the latency equal to or smaller than the second threshold value (Yes at Step S12b), then the system control proceeds to Step S12c. On the other hand, if the performance requirements with respect to the server do not have the throughput equal to or greater than a first threshold value and/or do not have the latency equal to or smaller than a second threshold value (No at Step S12b), then the system control proceeds to Step S12d.

At Step S12c, the server selection device 10 selects a bare metal as the server type, and the system control proceeds to Step S12g.

At Step S12d, based on the analysis result obtained at Step S12a, the server selection device 10 determines whether or not the functional requirements with respect to the server need the OS either to be an OS other than a predetermined OS (for example, a non-customized OS such as Linux) or to be a customized OS. If it is determined that the OS either needs to be an OS other than a predetermined OS or needs to be a customized OS (Yes at Step S12d), then the system control proceeds to Step S12e. On the other hand, if it is determined that the OS neither needs to be an OS other than a predetermined OS nor needs to be a customized OS (No at Step S12d), then the system control proceeds to Step S12f.

At Step S12e, the server selection device 10 selects a virtual machine as the server type, and the system control proceeds to Step S12g. At Step S12f, the server selection device 10 selects a container as the server type, and the system control proceeds to Step S12g.

At Step S12g, the server selection device 10 sets the server type, which is selected at Step S12c, Step S12e, or Step S12f, in the flavor indicating the server type in the abstract template analyzed at Step S12a; and generates a specific template. Once the operation at Step S12g is completed, the system control proceeds to Step S13 illustrated in FIG. 6A.

Thus, in the server selection operation illustrated in FIG. 6B, firstly, a bare metal is selected if the throughput and real-time performance is strongly required by the server. Regarding the first threshold value and the second threshold value mentioned above, at the value at which the actual performance of each server gets decided, if the throughput is equal to or greater than the first threshold value or the latency is equal to or smaller than the second threshold value, a bare metal is selected. More particularly, an order management DB of a Web shopping system requires a strong consistency, thereby making it difficult to perform operations in a dispersed manner. Hence, for a system of a certain scale or beyond, it is appropriate to select a bare metal. On the other hand, in a DB system in which a strong consistency is not required and eventual consistency is allowed, it becomes possible to scale out using a dispersion Key-Value type DB such as memcached. Hence, a container or a virtual machine becomes the target for selection.

Subsequently, in the server selection operation illustrated in FIG. 6B, the server type is narrowed down using the OS of the server. More particularly, for example, either the normal Linux is used as the server OS, or a virtual machine is selected if, after referring to the functional requirements of the user about whether an OS other than Linux is to be used or whether customization is required even if Linux is used, an OS other than Linux is to be used or customization is required even if Linux is used. Lastly, in the server selection operation illustrated in FIG. 6B, a container is selected in the case of a server, such as a Web server, which is capable of scaling out and in which Linux can be used. Thus, in the past, from among the servers of the same server type, a server closer to the requirements was selected. In contrast, in the embodiment, a server closer to the requirements can be selected from among the servers of a plurality of server types.

(Abstract Template and Specific Template)

Figure 7A:
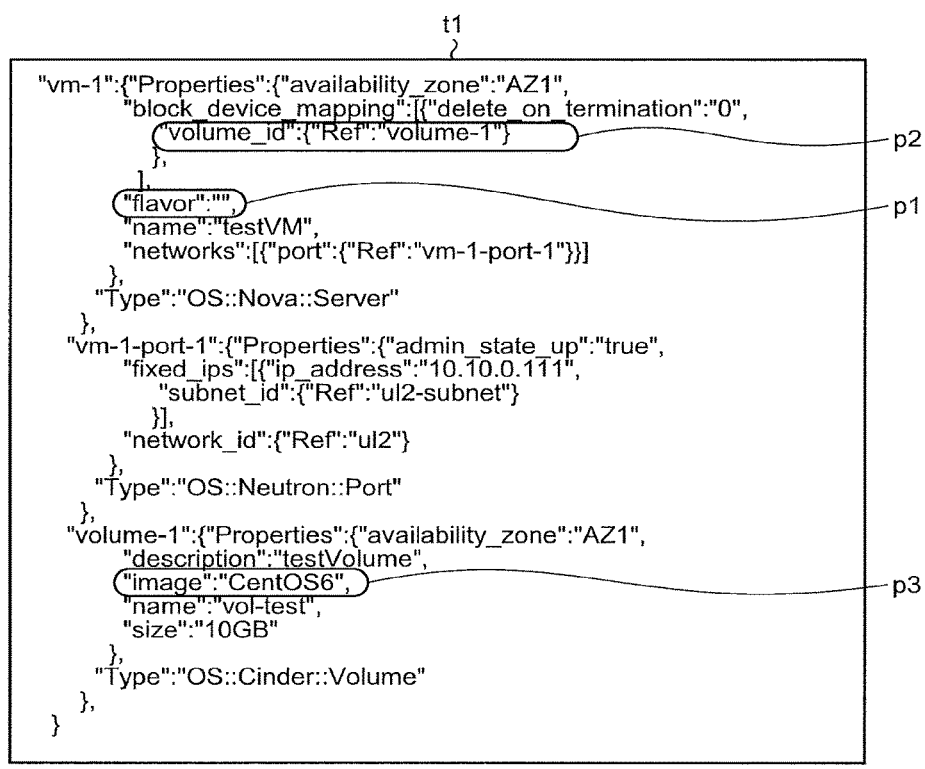
FIG. 7A is a diagram illustrating an example of an abstract template.

FIG. 7A is a diagram illustrating an example of an abstract template. FIG. 7B is a diagram illustrating an example of a specific template. In the embodiment, from an abstract template that is specified by a user and that is illustrated in FIG. 7A, after the server connection configuration and the installed software are determined, the server type is narrowed down according to the functional requirements and the performance requirements of the user, and the specific template as illustrated in FIG. 7B is provided as a configuration proposal.

In FIG. 7A is illustrated a portion of an exemplary abstract template t1 that is written in the format of the JSON template used in OpenStack Heat. The abstract template t1 is an abstract template for defining the configuration of a server "vm-1". In the abstract template t1, the "flavor" indicating the server type is not specified (see a boxed portion p1). Moreover, in the abstract template t1, an image used as a volume is specified (see boxed portions p2 and p3), and the software is determined from the specified image. In the example illustrated in FIG. 7A, CentOS6 is specified as the image (see the boxed portion p3). The abstract template t1 defines the attributes of the server "vm-1", network information of the server "vm-1", and the image file to be used in the server "vm-1". In the case of defining abstract templates for a plurality of servers, the abstract template t1 is repeatedly written for each server.

In FIG. 7B is illustrated a portion of an exemplary specific template t2 that is written in the format of the JSON template used in OpenStack Heat. The specific template t2 is a specific template for defining the configuration of the server "vm-1". In the specific template t2, because a bare metal is selected as the server type of the server "vm-1", for example, "baremetal" indicating a bare metal is specified in the "flavor" indicating the server type (see a boxed portion p4). Alternatively, for example, if a container having "a" as the number of CPU cores and having b GB of RAM (Random Access Memory) capacity is selected as the server type of the server "vm-1"; then, for example, "container (CPU: a, RAM: b GB) is specified in the "flavor". Similarly, for example, if a virtual machine having "c" as the number of CPU cores and having d GB of RAM capacity is selected as the server type of the server "vm-1"; then, for example, "virtualmachine (CPU: c, RAM: d GB) is specified in the "flavor". Thus, containers and virtual machines have a plurality of "flavor" with different resources such as the number of CPU cores and the RAM capacity. Hence, when a container or a virtual machine is selected as the server type of the server "vm-1", the "flavor" including the definition of the resources such as the number of CPU cores and the RAM capacity is specified as the server type. Meanwhile, in the specific template t2, the image used as the volume is specified in an identical manner to that in the abstract template t1 (see the boxed portions p2 and p3). The specific template t2 defines the server type of the server "vm-1", the attributes of the server "vm-1", network information of the server "vm-1", and the image file to be used in the server "vm-1". In the case of defining specific templates for a plurality of servers, the specific template t2 is repeatedly written for each server.

(Effect of Embodiment)

According to the embodiment, the server type that is appropriate for the performance requirements and the functional requirements of the user with respect to the server is automatically selected, thereby enabling achieving reduction in the man-hours taken for server designing. Moreover, in the embodiment, batch provisioning is performed after the user has approved the proposed specific template, and test cases meant for verifying the performance of the batch-provisioned group of virtual resources are automatically extracted and executed. Hence, in the embodiment, the user can easily confirm that the performance of the system that is built in the cloud satisfies the performance requirements, thereby enabling achieving reduction in the man-hours taken for performance verification. Moreover, in the embodiment, the user can easily perform, on demand, the operations including building a virtual environment by selecting the appropriate server type, confirming whether or not the built virtual environment satisfies the performance requirements and the function requirements, and starting the actual implementation of the virtual environment.

(Modification Example of Embodiment)

In the embodiment, based on the result of parsing an abstract template, the configuration of connection among the servers and the installed software in each server is known. However, that is not the only possible case, and the configuration of connection among the servers and the installed software in each server can be known based on the result of parsing the specific template that is obtained by setting the server type in the abstract template. Alternatively, it is possible to examine the volumes of a user tenant that is generated based on the specific template and, based on the result of analysis about which software is implemented in which virtual devices of the user tenant with what relation of connection, the configuration of connection among the servers and the installed software in each server can be known.

Moreover, in the embodiment, in an abstract template in which the server type is not set, the server type selected according to the server selection operation is set and a specific template is generated. However, that is not the only possible case. Alternatively, in a template in which the server type is already set, the server type selected according to the server selection operation cab be set in an overwriting manner and a specific template can be generated.

Furthermore, in the embodiment, the server selection operation is performed to select one of the server types of a bare metal, a container, and a virtual machine. However, that is not the only possible case. Alternatively, along with selecting the server type; individual servers having different performances (for example, the number of CPU cores, the memory capacity, and the type or performance of the communication interface) for each same server type provided in advance can be further selected according to the configuration of connection among the servers, the software installed in each server, the performance requirements, and the functional requirements.

Moreover, in the embodiment, the Web 3-tier model is given as an example of the "connection pattern". However, that is not the only possible case. Alternatively, the embodiment can be applied in examples in which various functions of a plurality of electronic mail servers, such as transmission servers, reception servers, and virus check servers, are allotted in a dispersed manner in a plurality of virtual machines. That is, the embodiment can also be applied in a case in which a single function is provided by allotting at least two or more functions in a dispersed manner in at least two or more virtual machines.

(Regarding Device Configuration of Server Selection Device)

The constituent elements of the server selection device 10 illustrated in FIG. 1 are merely conceptual, and need not be physically configured as illustrated. That is, the specific manner of the separation and integration of functions of the server selection device 10 is not limited to the example illustrated in the drawings; and the constituent elements, as a whole or in part, can be separated or integrated either functionally or physically based on various types of loads or use conditions.

Moreover, some or all of the operations performed in the server selection device 10 can be implemented using a processor such as a CPU (Central Processing Unit) or using programs that are analyzed and executed by a processor. Alternatively, the operations performed in the server selection device 10 can be implemented using hardware such as a wired logic.

Of the operations described in the embodiment, some or all of the operations explained as being performed automatically can be performed manually. Similarly, some or all of the operations explained as being performed manually can be performed automatically by a known method. The processing procedures, the control procedures, specific names, a variety of data, and information including parameters described in the embodiment or shown in the drawings can be changed as required unless otherwise specified.

(Regarding Program)

Figure 8:
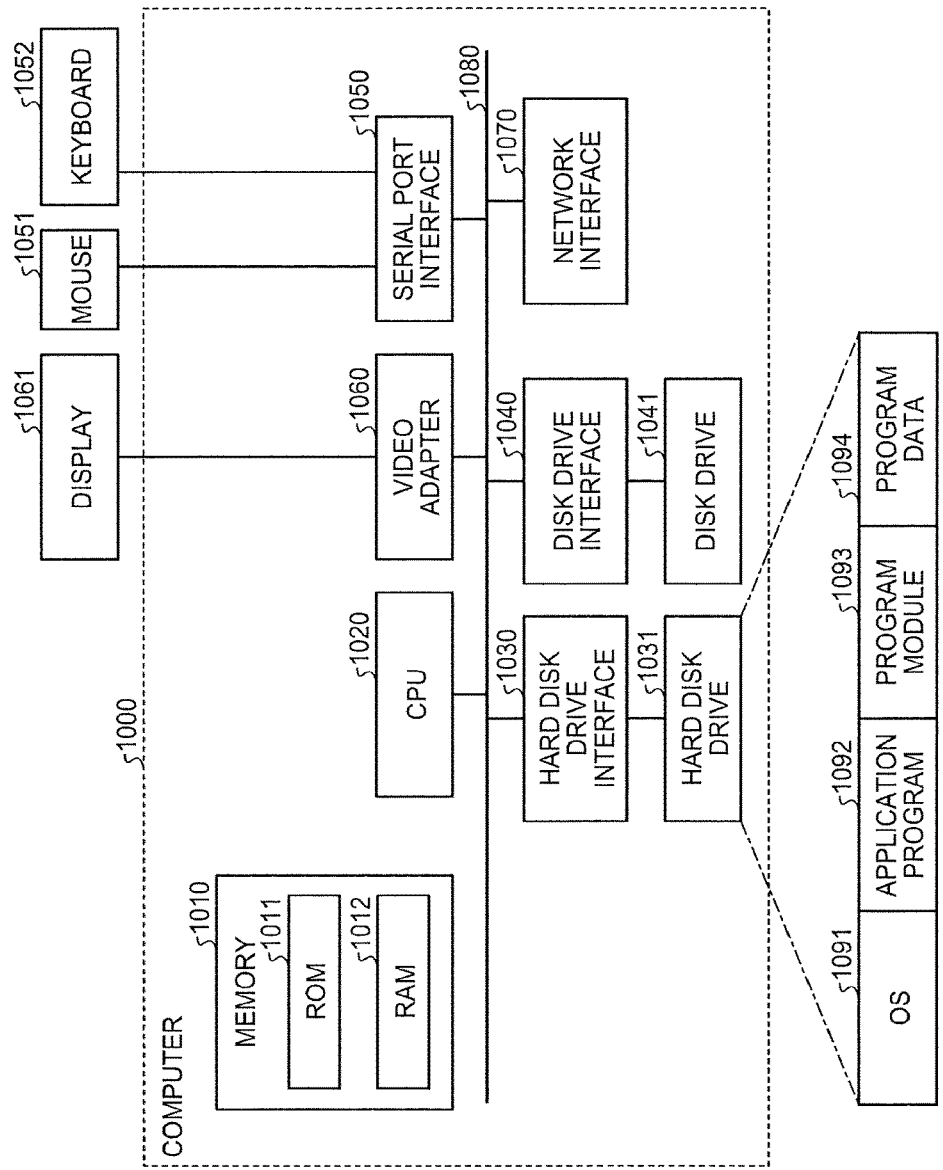
FIG. 8 is a diagram illustrating an exemplary computer in which the server selection device is implemented by executing a program.

FIG. 8 is a diagram illustrating an exemplary computer in which the server selection device is implemented by executing a program. A computer 1000 includes, for example, a memory 1010 and a CPU 1020. Moreover, the computer 1000 includes a hard disk drive interface 1030, a disk drive interface 1040, a serial port interface 1050, a video adapter 1060, and a network interface 1070. In the computer 1000, those constituent elements are connected to each other by a bus 1080.

The memory 1010 includes a ROM (Read Only Memory) 1011 and a RAM 1012. The ROM 1011 is used to store, for example, a boot program such as BIOS (Basic Input Output System). The hard disk drive interface 1030 is connected to a hard disk drive 1031. The disk drive interface 1040 is connected to a disk drive 1041. For example, a detachably attachable memory medium such as a magnetic disk or an optical disk is inserted in the disk drive 1041. The serial port interface 1050 is connected to, for example, a mouse 1051 and a keyboard 1052. The video adapter 1060 is connected to, for example, a display 1061.

The hard disk drive 1031 is used to store, for example, an OS 1091, an application program 1092, a program module 1093, and program data 1094. Thus, the program that defines the operations of the server selection device 10 is stored as the program module 1093, in which instructions to be executed by the computer 1000 are written, in the hard disk drive 1031, for example. For example, the program module 1093 meant for performing the information processing identical to the functional configuration of the server selection device 10 is stored in the hard disk drive 1031.

Moreover, setting data that is used in the operations according to the embodiment is stored as the program data 1094 in, for example, the memory 1010 and the hard disk drive 1031. Then, as required, the CPU 1020 reads the program module 1093 and the program data 1094, which is stored in the memory 1010 or the hard disk drive 1031, into the RAM 1012 and executes the same.

Meanwhile, the program module 1093 and the program data 1094 need not be stored in the hard disk drive 1031, and alternatively can be stored in, for example, a detachably attachable memory medium and can be read by the CPU 1020 via the disk drive 1041. Still alternatively, the program module 1093 and the program data 1094 can be stored in another computer that is connected via a network (such as a LAN (Local Area Network) or a WAN (Wide Area Network)). Then, the program module 1093 and the program data 1094 can be read by the CPU 1020 via the network interface 1070.

Meanwhile, the embodiment and the modification examples thereof are to be construed as embodying all modifications and alternative constructions that may occur to one skilled in the art that fairly fall within the basic teaching herein set forth.

REFERENCE SIGNS LIST

S virtual device system
1 user terminal
10 server selection device
11 abstract-template and requirement analyzing unit
12 server selecting unit
13 specific template generating unit
14 tenant generating unit
15 test case obtaining unit
16 test executing unit
20 test case DB
20a software relationship table
20b connection pattern information table
20c test case table
100 server selection system
200 cloud controller
301-1 bare metal
301-2 meant-for-container physical machine
301a-2, 301b-2 container
301-3, 302, 303 physical machine
301a-3, 301b-3 virtual machine
302a virtual router
302b virtual network
302c virtual load balancer
303a, 303b virtual storage
1000 computer
1010 memory
1020 CPU

The invention claimed is:

1. A server selection device comprising:
processing circuitry configured to:
receive
a first-type template, in which a configuration of a virtual environment including a server is written,
a performance requirement indicating throughput or latency demanded by a user with respect to the server, and
a functional requirement indicating information about OS (Operating System) that is run in the server; and
select,
when the performance requirement represents a performance condition indicating throughput equal to or greater than a first threshold value or indicating latency equal to smaller than a second threshold value, a bare metal server as type of the server,
when the performance requirement does not represent the performance condition and when the functional requirement represents a functional condition indicating OS other than a predetermined OS or indicating OS requiring customization, select a virtual machine as type of the server, and
when the performance requirement does not represent the performance condition and when the functional requirement does not represent the functional condition, select a container-type virtual server as type of the server.

2. The server selection device according to claim 1, wherein the processing circuitry is further configured to generate a second-type template by reflecting type of the server as selected at the selecting in the first-type template.

3. The server selection device according to claim 2, wherein the processing circuitry is further configured to:
generate the virtual environment based on the second-type template;
analyze information about software installed in the server which is included in the virtual environment, and analyze configuration of connection among each of the servers;
based on information about the software and configuration of connection among each of the servers, determine software-by-software classification, group-by-group classification, or function-by-function classification of software running in each of the servers included in the virtual environment and determine connection pattern of the software, and obtain from a database a test pattern for each classification and a test pattern for each connection pattern; and
execute test patterns, which are obtained at the obtaining, with respect to the virtual environment, and measure performance of each of the servers included in the virtual environment and measure system performance of the virtual environment.

4. A server selection method implemented by a server selection device, comprising:
a receiving step that includes receiving input of
a first-type template, in which a configuration of a virtual environment including a server is written,
a performance requirement indicating throughput or latency demanded by a user with respect to the server, and
a functional requirement indicating information about OS (Operating System) that is run in the server; and
a selecting step that,
when the performance requirement represents a performance condition indicating throughput equal to or greater than a first threshold value or indicating latency equal to smaller than a second threshold value, includes selecting a bare metal server as type of the server,
when the performance requirement does not represent the performance condition and when the functional requirement represents a functional condition indicating OS other than a predetermined OS or indicating OS requiring customization, includes selecting a virtual machine as type of the server, and when the performance requirement does not represent the performance condition and when the functional requirement does not represent the functional condition, includes selecting a container-type virtual server as type of the server.

5. The server selection method according to claim 4, further comprising a template generating step that includes generating a second-type template by reflecting type of the server as selected at the selecting step in the first-type template.

6. The server selection method according to claim 5, further comprising:
- a virtual environment generating step that includes generating the virtual environment based on the second-type template;
- an analyzing step that includes analyzing information about software installed in the server which is included in the virtual environment, and analyzing configuration of connection among each of the servers;
- an obtaining step that, based on information about the software and configuration of connection among each of the servers, includes determining software-by-software classification, group-by-group classification, or function-by-function classification of software running in each of the servers included in the virtual environment and determining connection pattern of the software, and includes obtaining from a database a test pattern for each classification and a test pattern for each connection pattern; and
- a test executing step that includes executing test patterns, which are obtained at the obtaining step, with respect to the virtual environment, and includes measuring performance of each of the servers included in the virtual environment and measuring system performance of the virtual environment.

7. A non-transitory computer-readable recording medium having stored a server selection program for causing a computer to execute a process comprising:
- a receiving step that includes receiving input of
  - a first-type template, in which a configuration of a virtual environment including a server is written,
  - a performance requirement indicating throughput or latency demanded by a user with respect to the server, and
  - a functional requirement indicating information about OS (Operating System) that is run in the server; and
- a selecting step that,
  - when the performance requirement represents a performance condition indicating throughput equal to or greater than a first threshold value or indicating latency equal to smaller than a second threshold value, includes selecting a bare metal server as type of the server,
  - when the performance requirement does not represent the performance condition and when the functional requirement represents a functional condition indicating OS other than a predetermined OS or indicating OS requiring customization, includes selecting a virtual machine as type of the server, and
  - when the performance requirement does not represent the performance condition and when the functional requirement does not represent the functional condition, includes selecting a container-type virtual server as type of the server.

8. The non-transitory computer-readable recording medium according to claim 7, wherein the process further comprises a template generating step that includes generating a second-type template by reflecting type of the server as selected at the selecting step in the first-type template.

9. The non-transitory computer-readable recording medium according to claim 8, wherein the process further comprises:
- a virtual environment generating step that includes generating the virtual environment based on the second-type template;
- an analyzing step that includes analyzing information about software installed in the server which is included in the virtual environment, and analyzing configuration of connection among each of the servers;
- an obtaining step that, based on information about the software and configuration of connection among each of the servers, includes determining software-by-software classification, group-by-group classification, or function-by-function classification of software running in each of the servers included in the virtual environment and determining connection pattern of the software, and includes obtaining from a database a test pattern for each classification and a test pattern for each connection pattern; and
- a test executing step that includes executing test patterns, which are obtained at the obtaining step, with respect to the virtual environment, and includes measuring performance of each of the servers included in the virtual environment and measuring system performance of the virtual environment.

* * * * *